United States Patent [19]
Watabe

[11] Patent Number: 6,147,952
[45] Date of Patent: Nov. 14, 2000

[54] OPTICAL DISK APPARATUS FOR REPRODUCING INFORMATION FROM AN OPTICAL RECORDING MEDIUM

[75] Inventor: Kazuo Watabe, Kanagawa-ken, Japan

[73] Assignee: Kabushiki Kaisha Toshiba, Kawasaki, Japan

[21] Appl. No.: 09/272,310

[22] Filed: Mar. 19, 1999

[30] Foreign Application Priority Data

Mar. 20, 1998 [JP] Japan .................................. 10-071974

[51] Int. Cl.$^7$ ...................................................... G11B 7/00
[52] U.S. Cl. .......................................... 369/111; 369/120
[58] Field of Search ..................................... 369/112, 110, 369/109, 44.24, 44.28, 275.3, 44.41, 44.42, 111, 120

[56] References Cited

U.S. PATENT DOCUMENTS

| | | | |
|---|---|---|---|
| 4,815,060 | 3/1989 | Nomura ................................ | 369/44.42 |
| 4,897,828 | 1/1990 | Yoshitoshi et al. ................... | 369/44.42 |
| 5,146,445 | 9/1992 | Nakamura et al. ................... | 369/44.41 |
| 5,268,886 | 12/1993 | Nagashima et al. ................. | 369/44.41 |
| 5,616,390 | 4/1997 | Miyagawa et al. .................. | 369/275.3 |
| 5,835,479 | 11/1998 | Miyagawa et al. .................. | 369/275.3 |
| 5,872,767 | 2/1999 | Nagai et al. .......................... | 369/275.3 |
| 5,892,740 | 4/1999 | Nagasawa et al. ................... | 369/275.3 |
| 5,933,410 | 8/1999 | Nakane et al. ....................... | 369/275.3 |
| 5,936,933 | 8/1999 | Miyamoto et al. .................. | 369/275.3 |
| 5,982,738 | 11/1999 | Miyamoto et al. .................. | 369/275.3 |

*Primary Examiner*—Nabil Hindi
*Attorney, Agent, or Firm*—Foley & Lardner

[57] ABSTRACT

An optical disk apparatus is capable of reproducing information from an optical disk 10. The optical disk apparatus mainly includes an illuminating unit which is formed from a semiconductor laser 14, a collimator lens 15, a polarization beam splitter (PBS) 16 and a ½-wavelength converter 17, as well as an objective lens 18, that focuses a light beam onto the optical disk 10; a two-segment split photo detector 21 which detects the light beam reflected by the optical disk 10; and a signal processing circuit 27 which processes a signal obtained by the two-segment split photo detector 21 to output a signal for reproduction. The two-segment split photo detector 21 has a divisional line 22 parallel to a line tangent to the track of the optical disk 10, and the line 22 is shifted away from the center line of the zero-order diffracted beam by a distance d in the direction of the disk radius, so that the light receiving surface of the photo detector 21 is divided into two areas or segments 23a and 23b by the divisional line 22. The signal processing circuit 27 is capable of processing the difference between and the sum of signal values detected in the detecting areas 22a and 22b, and it outputs the difference signal or sum signal as the playback signal of the optical desk 10.

13 Claims, 8 Drawing Sheets

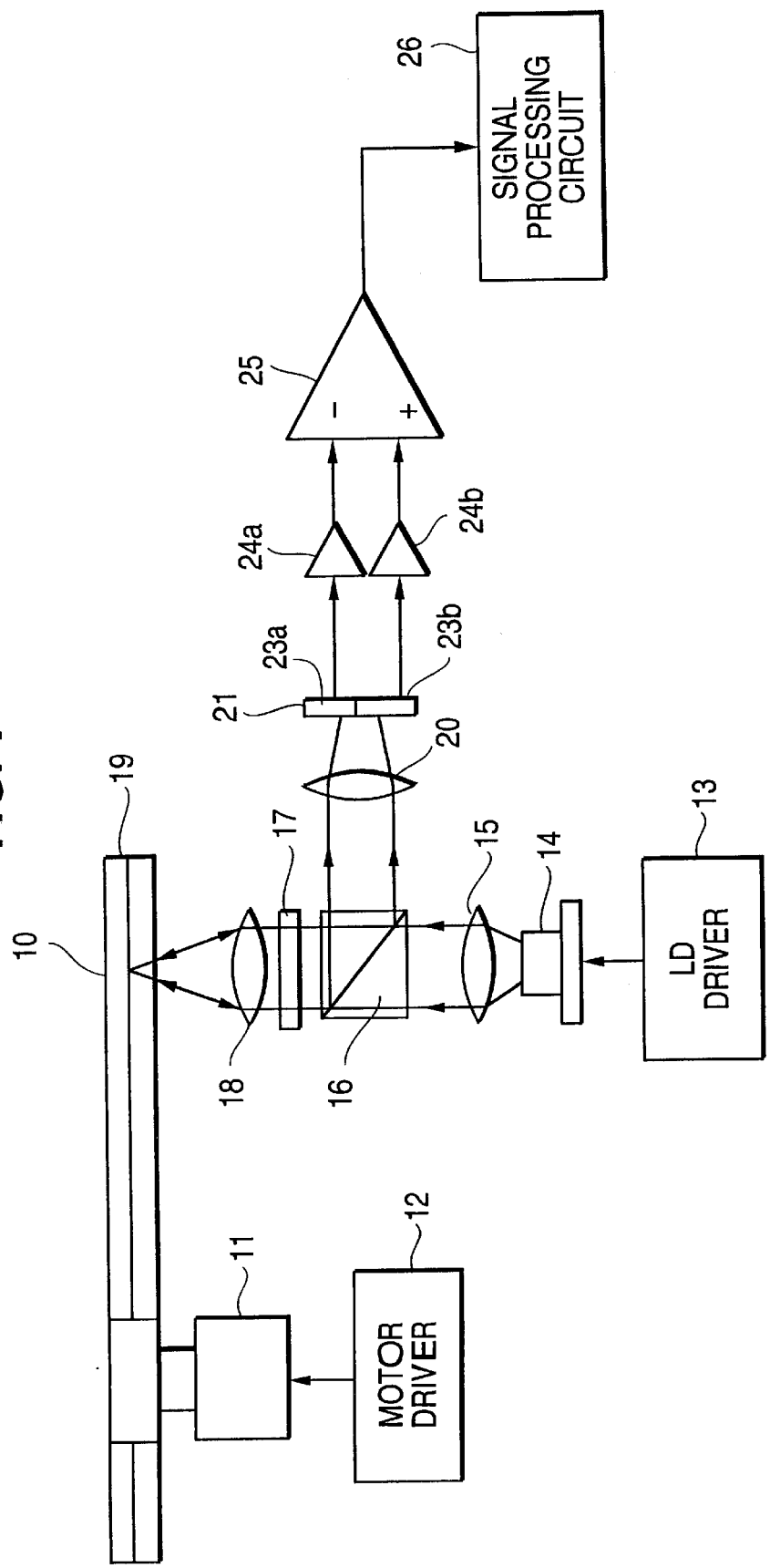

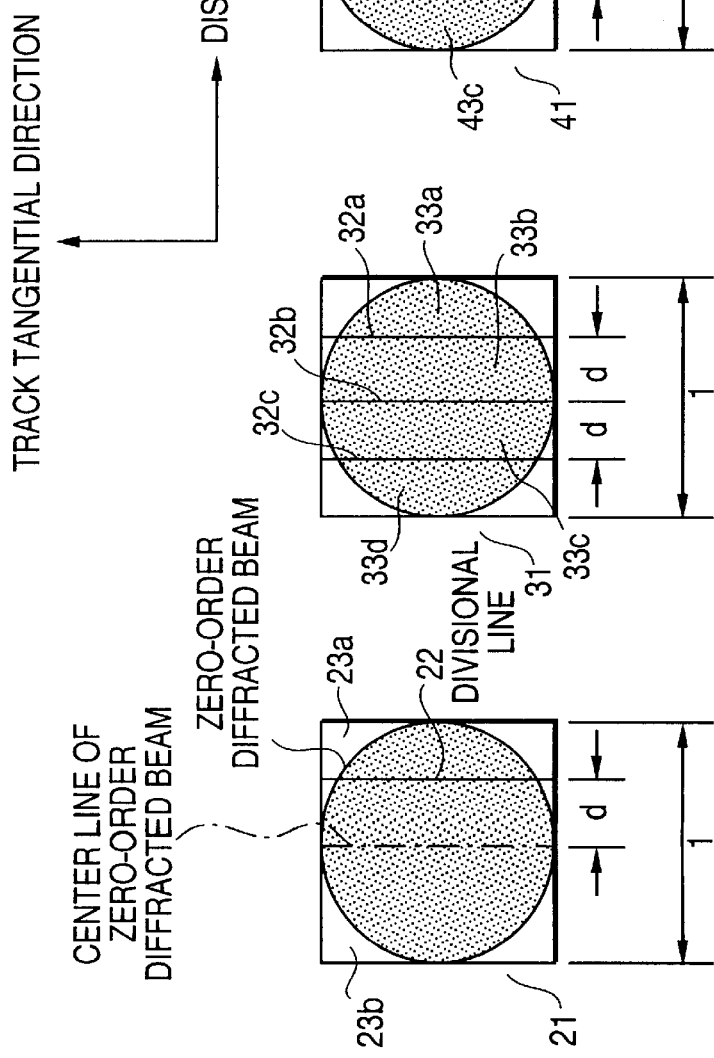

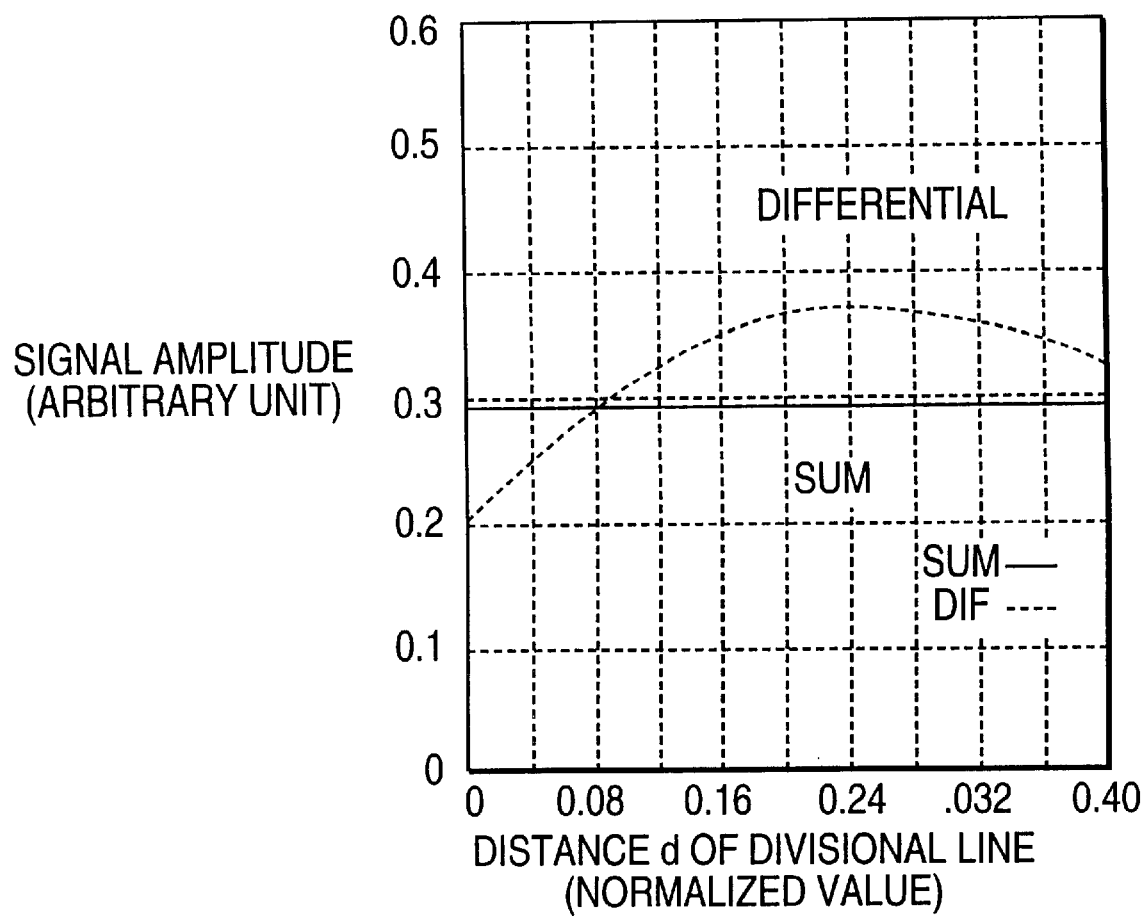

OPTICAL DISK APPARATUS FOR REPRODUCING INFORMATION FROM AN OPTICAL RECORDING MEDIUM

BACKGROUND

The present invention relates to an optical disk apparatus for optically reproducing information from an optical disk by focusing a light beam onto the optical disk upon which information is recorded, and more particularly to an optical disk apparatus for performing reproduction while moving a beam spot over an optical disk, the beam being shifted in position away from the center line of the prepit arrays in the radial direction relative to the center of the optical disk.

A DVD-RAM (Digital Versatile Disk-Random Access Memory) has been developed as one of several large-capacity rewritable optical disks, and the details of a standard for this DVD-RAM are described in a book named "DVD-Specifications for Rewritable Disc version 1.0". The book prescribes address information and the like must be pre-recorded in a header field as prepits. "Prepits" are information-containing pit arrays encoded with sector address information, permanently formed into the surface of the disk, and preceding the recording fields. The book also prescribes employing in recording fields both grooves and the lands that separate the grooves, which are created on the disk beforehand, and recording user information, such as image data, audio data or the like on both the lands and the grooves. Accordingly, it is required that the prepits must be playbacked from extensions of both a land track and a groove track in the same way.

FIG. 1 is a diagram showing an example disk format for this current type of DVD-RAM. The recording fields 42 for use in recording various kinds of the user information (such as image data and sound data, etc.) are formed by the lands 54 and the grooves 52, and the header field 44 in which the address information has been pre-recorded are formed by arrays of pits formed as the prepits 8. The center lines C1, D1 of these prepit arrays 8 are shifted radially (with respect to the center of the optical disk 10) in a manner such that the center lines C1, D1 are placed on extension lines of the boundaries between adjoining lands 54 and grooves 52, as is shown in FIG. 1.

Therefore, a beam spot 6 generated by focusing a light beam onto the optical disk 10 scans along the center lines of the lands 54 and the grooves 52 in the recording field 42, and the beam spot 6 also scans the prepit arrays and in the header field 44, shifted from prepit array center lines by a predetermined distance, a pitch tp/2 which is one-half of the track pitch tp.

The light beam reflected from the optical disk 10 is focused upon a photo detector which performs information reproduction from the land track and the groove track as well as from the prepit arrays. The photo detector has a light-receiving surface which is divided into two light-receiving segments by a divisional line extending tangentially parallel to the tracks of the optical disk 10, and the photo detector is disposed such that the divisional line passes approximately through the center of a zero-order diffracted beam of the reflected light beam. With regard to the information reproduction from the prepit arrays, a "push-pull" signal, which corresponds to the difference between output signals derived from the split light-receiving segments of the photo detector, is generated as the information playback signal. This playback signal is then processed by a signal processing circuit that then presents the information recorded within the prepit arrays as well as that recorded within the land track and the groove track.

To meet demands that such rewritable optical disks should achieve greater storage capacity, a high-density DVD-RAM that can record information at even higher areal densities than have been achieved by the current DVD-RAMs is under development. In this high-density DVD-RAM, to increase its areal recording density, the track pitch must be made narrower than that of current DVD-RAMs. Where the reproduction of information from a prepit array on a high-density DVD-RAM is carried out using a light beam by letting the beam spot be offset by a predetermined distance from the center line of the prepit array, as is done with the current DVD-RAM, this narrowing of the track pitch causes the distance between the center point of the beam spot and the center line of the prepit array to decrease so that the resulting distance is less than that employed in the current DVD-RAMs.

When deriving the push-pull signal from such a high-density DVD-RAM in the same manner as when doing so from the current DVD-RAM, it has been found the less the distance between the center point of the beam spot and the center line of the prepit array, the less the amplitude of the push-pull signal, and when the center of the beam spot scans a location just overlying the center line of the pre-pit array, the resulting amplitude of the push-pull signal becomes essentially zero. Therefore, when reproducing high density DVD-RAMs with the track pitch narrowed, the push-pull signal decreases in amplitude to the point where there can be difficulty in the reproduction of the information and, possibly, errors.

Accordingly, it is an object of the present invention to solve the above-mentioned problem by providing an optical disk apparatus capable of producing an information reproduction signal of greater signal amplitude even when used with a plurality of types of optical disks that differ in track pitch and in recording density, when reproducing information by using a light beam to scan certain lines spaced apart by a predefined distance from the center of a mark array having an optical phase difference relative to non-mark regions, such as those where prepit arrays are located.

SUMMARY OF THE INVENTION

The present invention has been made in view of the above-mentioned circumstances and is intended to solve the above-mentioned problems. Additional purpose and advantage of the invention are apparent from the following description and may be learned by practicing the invention.

To solve these problems, the present invention provides an optical disk apparatus for reproducing information from an optical recording medium, including a light emitting unit that focuses a light beam onto the optical recording medium, a detecting unit that detects the light beam reflected by the optical recording medium, a processing unit that processes a signal generated by the detecting unit and outputs a processed signal that reproduces the recorded information, wherein the optical recording medium has reproducible information formed as mark arrays which have an optical phase difference with respect to adjacent portions of the mark arrays, the detecting unit includes a detector with a detecting surface which is divided into multiple segments each of which segments produces an electrical signal, and the processing unit programs at any given moment to compute a weighted sum of the signals as a playback signal, where the weight may be positive or negative, the weight being chosen such that the playback signal produces an optimized information recorded in the optical medium, and outputs the weighted sum as the processed signal to reproduce information of the mark array.

Here, the detecting surface may include at least two segments separated by a first line that passes through the center of the detecting surface offset from the center of the zero-order diffracted beam on the detecting surface by a certain distance.

The first line may be parallel to the direction corresponding to a track tangential direction of the optical recording medium.

The certain distance may be a percentage of the diameter of the zero-order diffracted beam on the detecting surface in the range of between about 12 and 40 percent of the diameter.

The processing unit may be programmed to compute the difference between the signal outputs of the at least two segments separated by the first line, and may output the difference signal as the processed signal to produce information of the mark array.

The present invention further provides an optical disk apparatus for reproducing information from an optical recording medium, including a light emitting unit that focuses a light beam onto the optical recording medium, a detecting unit that detects the light beam reflected by the optical recording medium, a processing unit that processes a signal generated by the detecting unit and outputs a processed signal that reproduces the recorded information, wherein the optical recording medium has a first area on which rewritable information can be stored along a line and a second area on which reproducible information is formed as mark arrays which have an optical phase difference with respect to adjacent portions of the mark arrays and stored along a line being shifted away from the line on the first area by a predetermined distance, the light emitting unit focuses the light beam along the line on the first area, the detecting unit includes a detector with a detecting surface which is divided into multiple segments each of which segments produces an electrical signal, and the processing unit programs at any given moment to compute a weighted sum of the signals as a playback signal, where the weights are positive for the playback of information in the first area, and the weights may be positive or negative for the playback of information in the second area, and outputs the weighted sum as the processed signal to reproduce information of the rewritable reproducible information.

The detecting surface may include at least two segments separated by a first line that passes through the detecting surface offset from the center of the zero-order diffracted beam on the detecting surface by a certain distance.

The first line may be parallel to the direction corresponding to a track tangential direction of the optical recording medium.

The certain distance may be a percentage of the diameter of the zero-order diffracted beam on the detecting surface in the range of between about 12 and 40 percent of the diameter.

The processing unit may be programmed to compute the difference between the signal outputs of the at least two segments separated by the first line, and may output the difference signal as the processed signal to produce information on the second area.

The detecting surface may include at least three segments separated from each other by the first line and also by a second line parallel to the first line and offset from the center of the zero-order diffracted beam on the detecting surface by the same distance in the opposite direction.

The processing unit may be programmed to compute both the difference between the signal output of the segment to one side of center and the sum of the signal outputs of the central segment and the segment to the other side of center, and the difference between the signal output of the segment to the other side of center and the sum of the signal outputs of the central segment and the segment to the one side of center, and may output one of the difference signals as the processed signal to reproduce information on the second area.

The detecting surface may include at least four segments separated from each other by the first line and the second line and also by a third line parallel to the first line and the second line and passing through the center of the zero-order diffracted beam on the detecting surface.

The processing unit may be programmed to compute both the difference between the signal output of the segment at one edge of the detecting surface and the remaining three segment at the other edge and the difference between the signal output of the segment at the other edge of the detecting surface and the remaining three segments, and may output one of the difference signal as the processed signal to produce information on the second area.

The processing unit may also be programmed to compute the difference between the signal outputs of the segments on either side of the third line, and may output the difference signal as the tracking error signal on the first area.

The detecting surface may include at least eight segments separated from each other by the first, second and third lines and also diffracted beam on the detecting surface and perpendicular to the other three lines.

The processing unit may be programmed to compute both the difference between the signal output by the pair of segments adjoining at the fourth line and positioned at one edge of the detector and the sum of the signal outputs from the remaining segments and also the difference between the signal output by the pair of segments adjoining at the fourth line and positioned at the other edge of the detector and the sum of the signal outputs from remaining segments, and outputs one of the difference signals as the processed signal to reproduce information on the second area.

The processing unit may also be programmed to compute the difference between the outputs of the segments on either side of the third line, and outputs the difference signal as the tracking error signal on the first area.

The processing unit may also be programmed to compute the difference between the signal output by the diagonal pair of the four segments separated by the third line and fourth line and the signal output by the other diagonal pair, and may output the difference signal as the focusing error signal on the first and second areas.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 7 is a block diagram showing a configuration of an optical disk apparatus designed in accordance with an embodiment of the present invention.

FIGS. 8A–AD are diagrams showing the various examples of structures of the segmented photo detector for use in an optical disk apparatus designed in accordance with the present invention.

FIG. 9 is a diagram showing dependency of the reproduction signal amplitude upon the distance d between the center line of the photo detector and the divisional line between the two segments of the photo detector.

DESCRIPTION OF PREFERRED EMBODIMENTS

An embodiment of an optical disk apparatus of the present invention will now be described in more detail with reference to the accompanying drawings.

Figure 2:
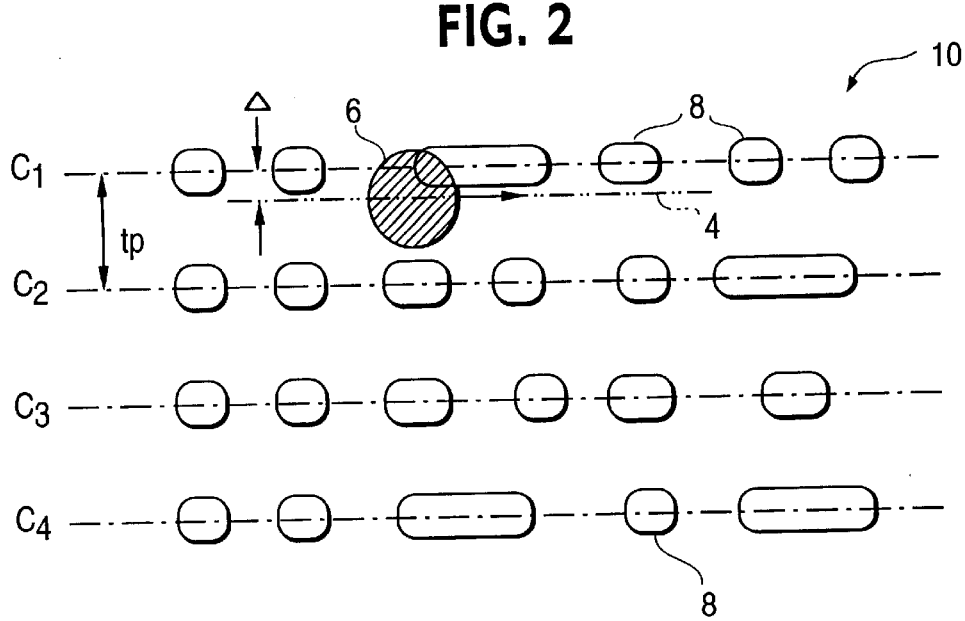
FIG. 2 is a diagram illustrating the relation between the prepits and the light beam spot as it scans an optical disk incorporating the present invention.

FIG. 2 illustrates how playback is performed from a mark array, such as a pit array, on an optical disk 10 placed into an optical disk apparatus that is designed in accordance with the present invention. As shown in FIG. 2, the pit arrays are formed along tracks C1, C2, C3, and C4 having a track pitch "Tp". If the optical disk is a DVD-RAM, these pit arrays constitute a "header field" containing, for example, address information or the like prerecorded. The track pitch Tp in this case is 1.48 μm. When reproducing the information recorded on the optical disk, an optical head is used to focus and move a light beam upon and over this optical disk to form a beam spot 6, as is shown in FIG. 2.

Here, the beam spot 6 scans not along the pit array 8 center lines C1, C2, C3, and C4 but along a lines 4 and other similarly situated lines (not shown) that are each shifted by a predetermined distance Δ from a corresponding one of the pit array center lines Cn in a radial direction (a vertical direction in FIG. 2) with respect to the center of the optical disk. In the header region (where the prepit arrays are formed) of the DVD-RAM shown in FIG. 2, the beam spot 6 is shifted by an amount A that is approximately 0.37 μm.

Figure 3:
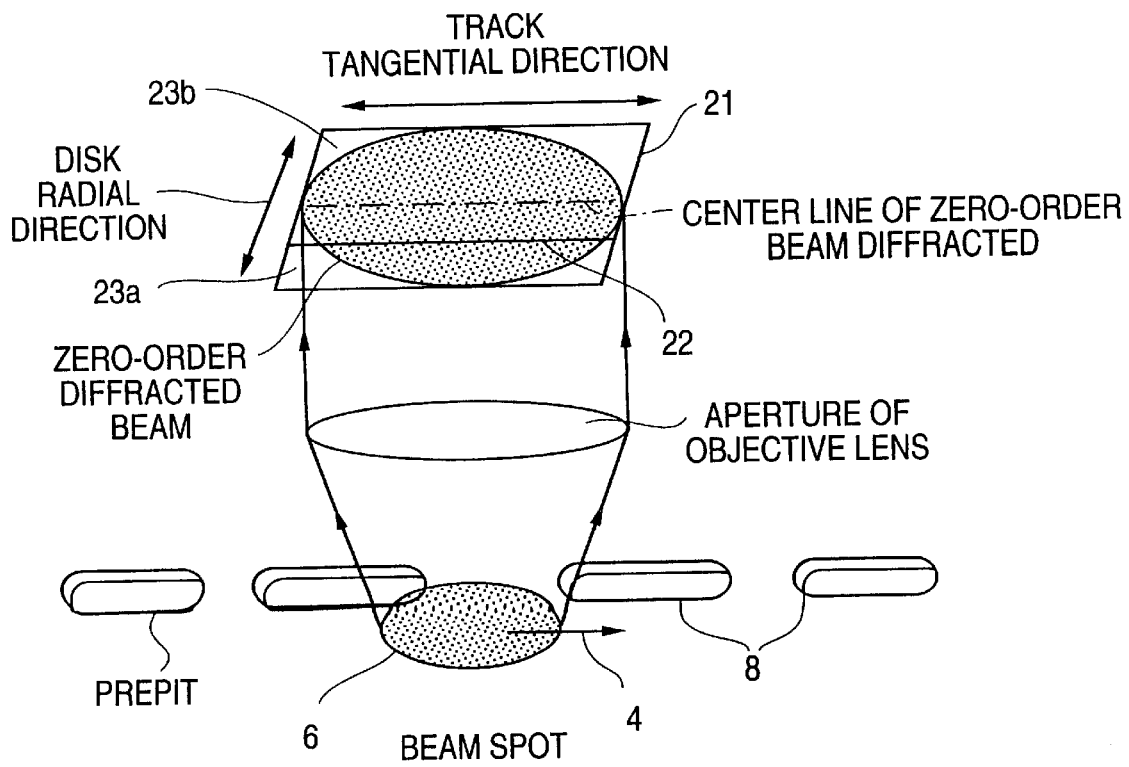
FIG. 3 is a diagram illustrating the relationship of the prepits to the beam spot on the optical disk as well as their relationship to the photo detector in the present invention.

FIG. 3 indicates the relative arrangement of one pit array 8 on the optical disk 10 and the beam spot 6, as well as a two-segment split photo detector 21 of the present invention. Reflected light from the beam spot 6 focused upon the optical disk 10 is trimmed of its margin by the aperture of an objective lens 18.

Thereafter, the resultant reflected light is guided to the two-segment split photo detector 21 by an optical system (not shown herein). This two-segment split photo detector 21 is designed so that its light receiving plane is divided into two areas 23a and 23b by a divisional line 22 that extends parallel to and tangent to the tracks, as shown in FIG. 3.

Here in the two-segment split photo detector of the optical disk apparatus for use in reproduction of the current DVD-RAM, the divisional line between the segments is positioned to pass through the center line of a zero-order diffracted beam which extends parallel with a line tangent to a track of the optical disk. In this invention, on the contrary, the divisional line of the two-segment split photo detector is shifted a predetermined amount in the radial direction with respect to the optical disk center from the center line of the zero-order diffracted beam as shown in FIG. 3.

The following paragraphs describe the results of employing the structure and disposition of the two-segment split photo detector as described in this invention with reference to FIGS. 4 to 7.

First of all, the conventional two-segment split photo detector in which the divisional line is located above the center line of the zero-order diffracted beam will be described with reference to FIG. 4.

Figure 4A:
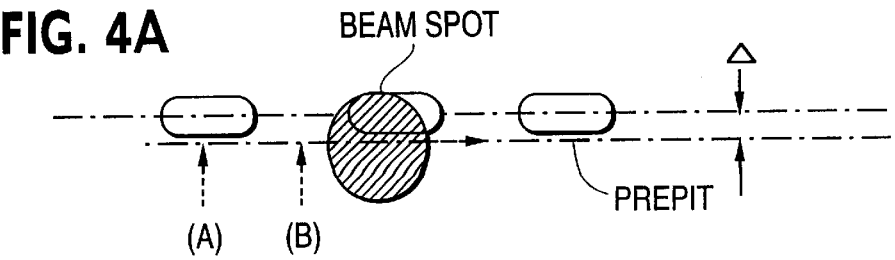
FIG. 4A is a diagram showing a prepit array on the optical disk and the beam spot scanning the locus overlying the prepit array.

FIG. 4A shows a prepit array on an optical disk and a beam spot scanning the locus overlying the prepits. In this example, the high-density DVD-RAM is assumed to have a beam spot diameter of 0.94 μm, a prepit width of 0.35 μm, a prepit depth of 150 nm and a distance Δ between the center line of the beam spot and a center line of the prepit of 0.275 μm respectively.

Figure 4B:
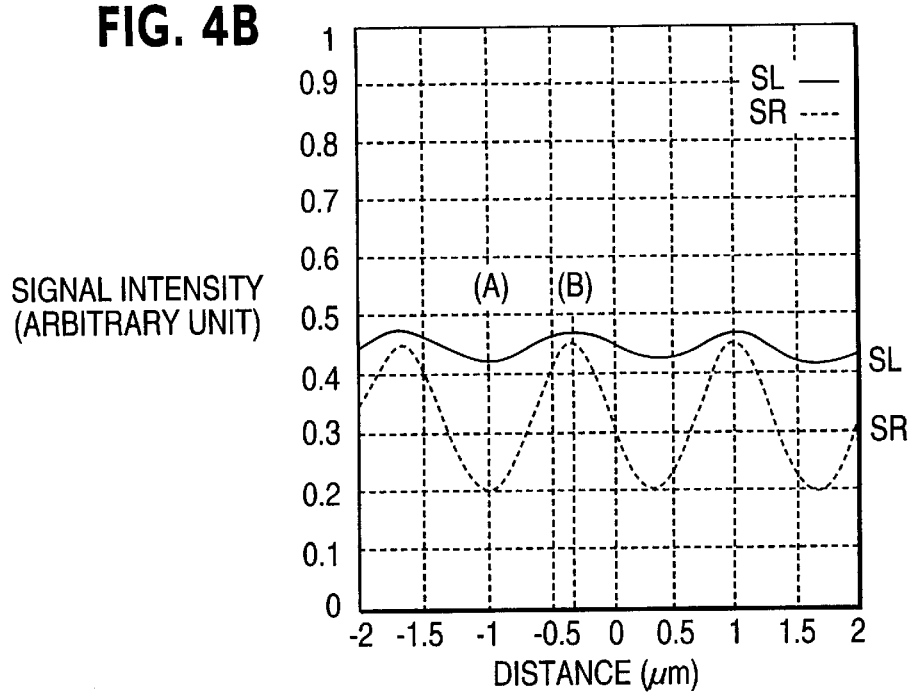
FIG. 4B is a diagram showing amplitudes of the two output signals generated by a two-segment split photo detector in a conventional method and apparatus where the beam spot scans along a locus shifted from the center line of the prepit by a distance Δ.

FIG. 4B shows signal intensities of the output signals of the conventional two-segment split photo detector, which has the divisional line located above the center line of the zero-order diffracted beam, with the beam spot arranged to scan along a locus shifted from the center line of the prepits by a distance Δ; and in which the X-axis of FIG. 4B corresponds to that of FIG. 4A. As shown in the prepit arrays of FIG. 4A, a 5T/5T single-frequency signal of the current DVD-ROM is assumed. Here, "nT/nT" means that the playback signal length of the pit is "nT" and that of the space (non-pit array) is "nT" at the specified scanning velocity, and "nT" is a channel clock interval.

Assuming that the output signals of the two-segment split photo detector, a signal from the right side of the two light-receiving segments relative to the direction of beam spot advancement is named "SR", and a signal from the left side of the two light-receiving segments or regions is named "SL". The signals SL and SR are in phase, as shown in FIG. 4B; that is, the signals SL and SR reach their minimum values at an intermediate point (A) in the direction of the prepit axis and reach their maximum values at an intermediate point (B) adjacent thereto. It can be estimated easily from FIG. 4B that the amplitude of the difference between the signals SL and SR will be smaller than the sum thereof.

Figure 4C:
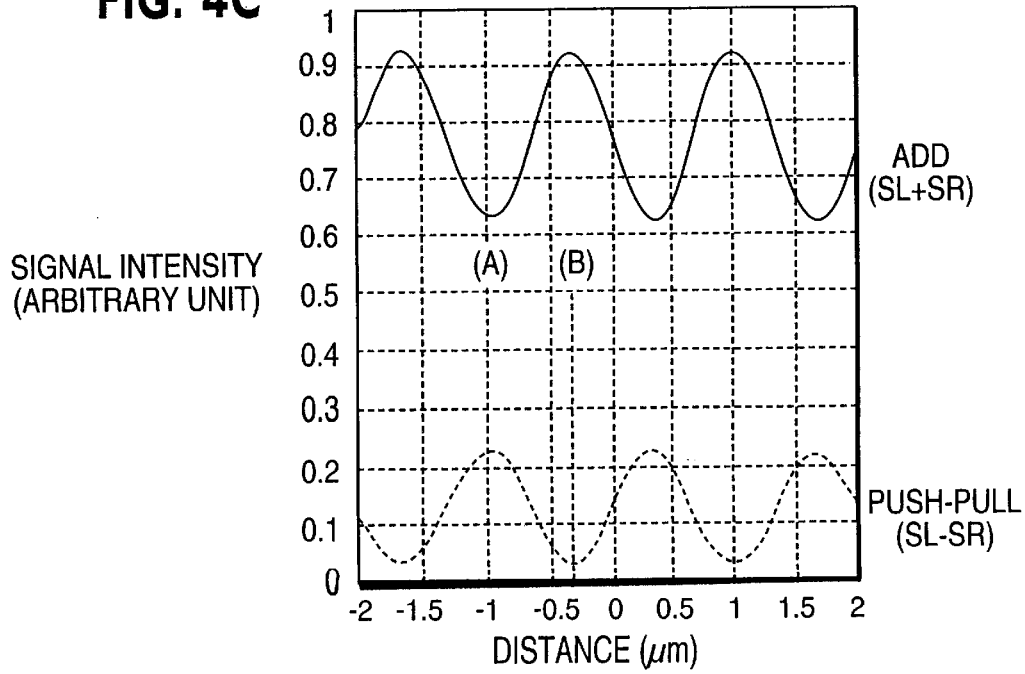
FIG. 4C is a diagram showing the amplitude of a sum signal and the amplitude of a difference signal using the conventional method and apparatus.

FIG. 4C shows the intensity of the sum signal and the intensity of the difference signal as described above. In this figure, the difference or "Push-Pull" signal is smaller in amplitude than the sum or "ADD" signal. Estimating from this information, the difference signal will be larger in amplitude than the sum signal in the case when the signals SR and SL are in inverse phase, that is, where one of them reaches its maximum value when the other reaches its minimum value. Therefore, in any case where the signals SL and SR can be caused to be in inverse phase relationship as a result of the placement of the divisional line of the photo detector, it can be expected that the signal amplitude of the difference signal will be larger than that of the sum.

Figure 5A:
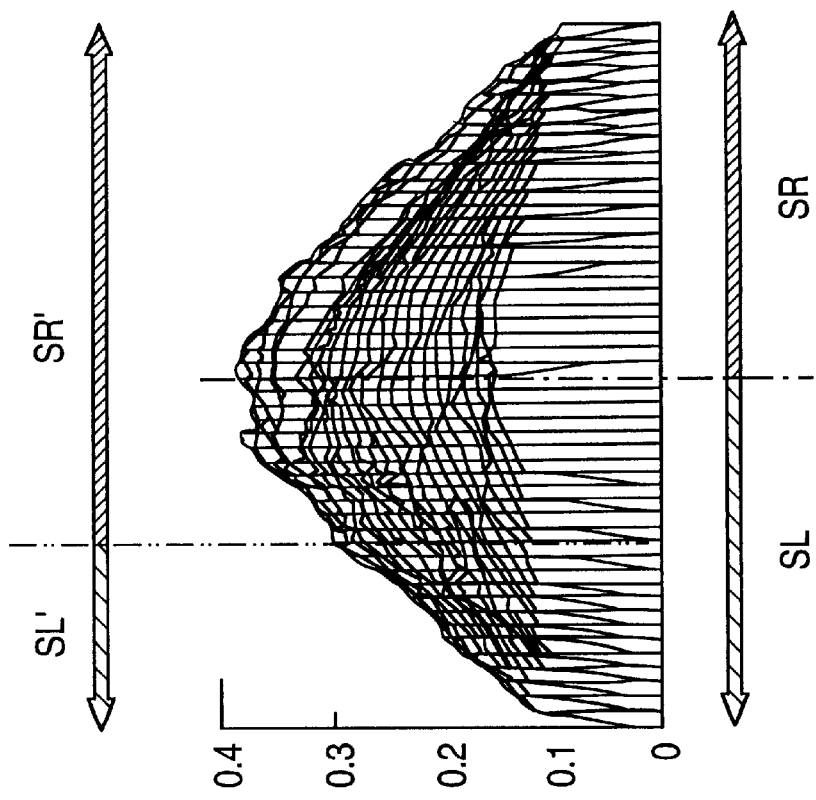
FIGS. 5A and 5B are diagrams showing the distribution of light intensity on the two-segment split photo detector when the beam spot is located, respectively, on points (A) and (B) of FIG. 4A.
Figure 5B:
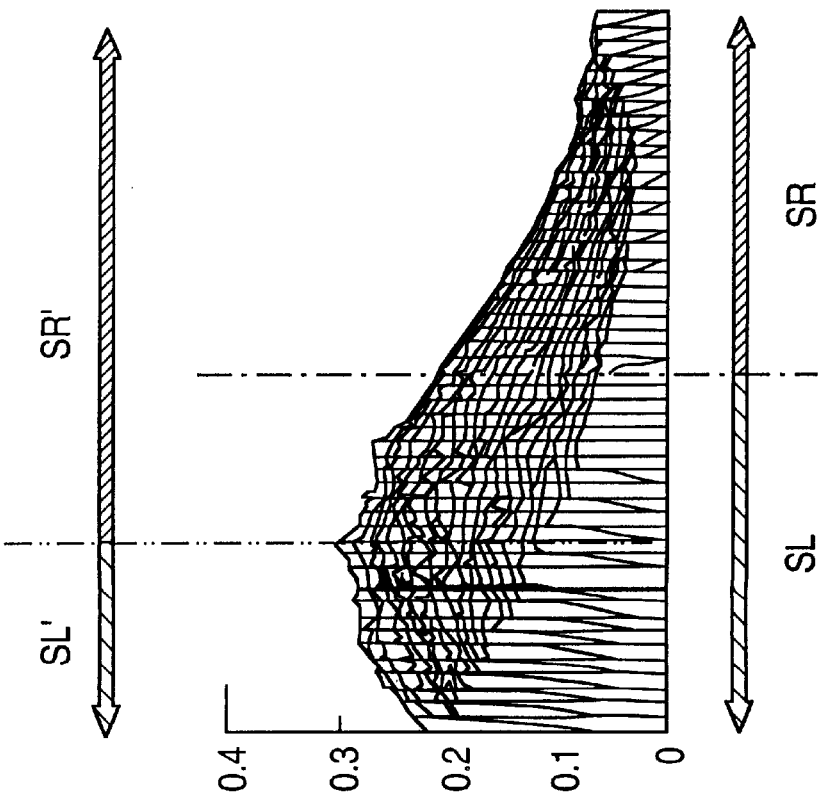

FIGS. 5A and 5B show distributions of light intensity on the two-segment split photo detector when the beam spot is positioned at respective points (A) and (B) of FIG. 4A. The X-axes of FIGS. 5A and 5B correspond to the direction of the disk radius. The Y-axes correspond to light intensity. The photo detector used in FIG. 4 is divided into two parts (or segments) 23a and 23b by the alternated long-and-short-dashed line that corresponds to the center point of the X-axis of FIGS. 5A and 5B, namely along the center line of the zero-order diffracted beam. The multiple plots illustrate light intensities at different positions along lines parallel to this center line. It is apparent that the signal intensities of the signals SL and SR are larger at the point (B) than at the point (A) when produced by the two-divisional photo detector as described above. That is, FIGS. 5A and 5B ensure that the signals SL and SR have the same phase as shown in FIG. 4B.

Focusing upon the distribution of light intensity shown in FIGS. 5A and 5B, the light intensity to the left quarter portion at the point (A) is larger than that at the point (B). The reason for this is that a large diffraction (caused by the pit) occurs at the point (A) which thereby causes a large deviation in the distribution of the overall light intensity. However, the deviation direction of the distribution of the light intensity depends upon the optical phase difference caused by the pit, and therefore it changes depending upon the pit shape, for example, the pit depth, and the inclination angle of the pit wall surface.

Next, the two-segment split photo detector is altered so that the divisional line located above the center line of the zero-order diffracted beam (shown as the alternate long and short dashed line) is shifted to the left and is located above the one-long, two-short dashed line in FIGS. 5A and 5B. The output signals corresponding to two light receiving areas divided by this repositioned divisional line are assumed to be named SL' and SR'. Now, when the beam spot moves from the point (A) to the point (B), the signal amplitude of the signal SR' increases while that of the signal SL' decreases, so that the signals SR' and SL' are now out of phase, or are in phase opposition.

Next, an explanation will be given with reference to FIG. 6 in which the two-divisional photo detector is constructed so that the divisional line is located away from the center line of the zero-order diffracted beam light as describe above.

Figure 6A:
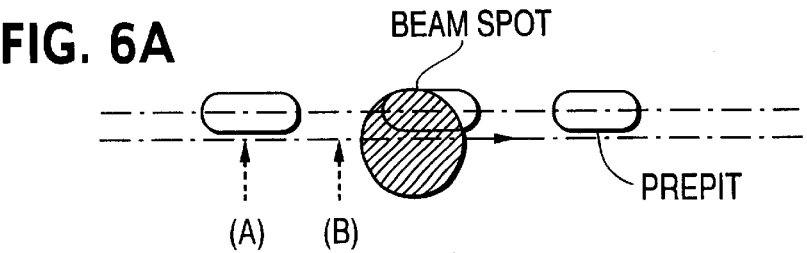
FIG. 6A is a diagram showing a prepit array on the optical disk and the beam spot scanning the locus overlying the prepit array.

FIG. 6A shows the prepits on an optical disk and a beam spot scanning over the prepits. The figure is the same as FIG. 4A to make the comparison easier. As with FIG. 4, this is a case in which the high-density DVD-RAM is assumed to have a beam spot diameter of 0.94 $\mu$m, a prepit width of 0.35 $\mu$m, a prepit depth of 150 nm and a distance $\Delta$ between the center of the beam spot and a center line of the prepit array of 0.275 $\mu$m. As for the prepit arrays, a 5T/5T single-frequency signal of the current DVD-ROM is assumed.

Figure 6B:
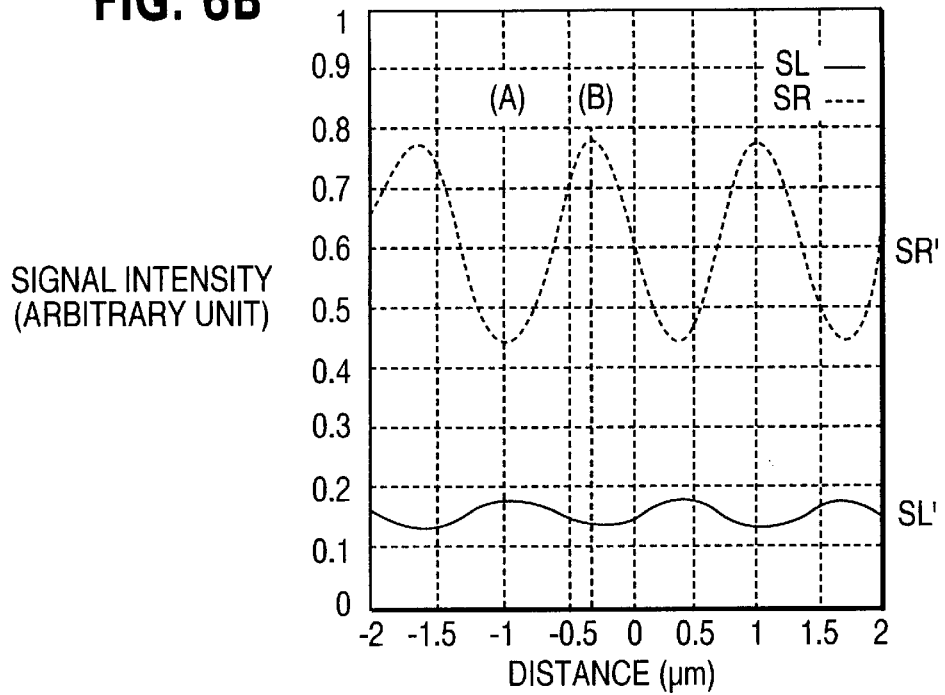
FIG. 6B is a diagram showing amplitudes of the output signals of a two-segment split photo detector designed in accordance with the present invention as the beam spot scans along a locus shifted from the center line of the prepit array by a distance Δ.

FIG. 6B shows the intensities of the output signals of the two-segment split photo detector, which has its divisional line shifted away from the center line of the zero-order diffracted beam, with the beam spot arranged to scan along a locus shifted from the center line of the prepits by a distance $\Delta$; and in which the X-axis of FIG. 6B corresponds to that of FIG. 6A. As was estimated above, FIG. 6B indicates that the signals SR' and SL' are in inverse phase.

Figure 6C:
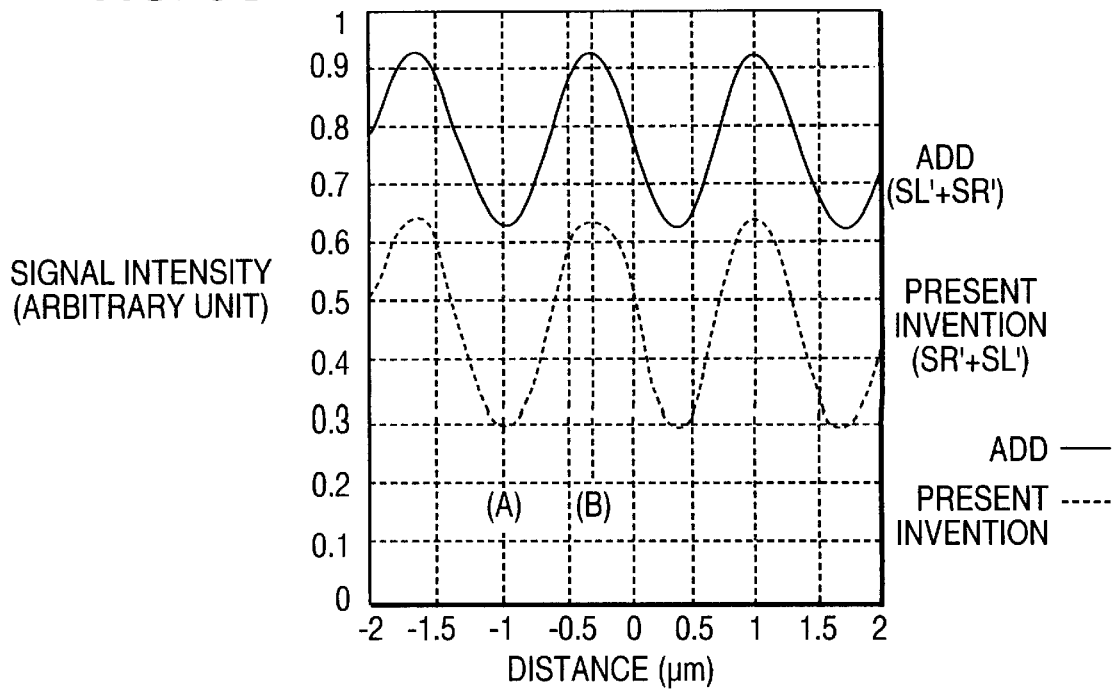
FIG. 6C is a diagram showing the amplitude of a sum signal and the amplitude of a difference signal computed as taught by the present invention.

FIG. 6C shows the intensity of the sum SR'+SL' and the amplitude of the difference SR'−SL'. Because the value of the sum signal does not depend upon the position of the divisional line, the intensity of the sum signal has the same waveform as shown in FIG. 4C. On the contrary, it is evident that the amplitude of the difference signal becomes larger than that of the sum signal, and the difference signal becomes an excellent signal to utilize.

As described above, according to this invention, the divisional line separating the two segments and parallel to a line tangent to the track and falling across the light receiving surface of the two-segment split photo detector is shifted away form the center line of the zero-order diffracted beam in the direction of the disk radius, so as to make the output signals corresponding to the two light receiving segments divided by the divisional line to have inverse phases with respect to each other; and then, the difference signal between the segment output signals can be obtained and utilized as a playback signal for the information recorded as the prepit arrays. Consequently, as compared to both the sum and the difference signals when the light receiving surface of the two-segment split photo detector is simply divided along the center line of the zero-order diffracted beam as is conventional, an excellent signal for reproduction having a larger amplitude is obtained.

Hereafter, each embodiment of an optical disk apparatus designed in accordance with the present invention will be described with reference to the accompanying drawings.

FIG. 7 presents the configuration of an optical disk apparatus as designed in accordance with a first embodiment of the present invention. An optical disk 10, either a current DVD-RAM or one of the new, high-density DVD-RAMs, has a recording layer 19 formed on an optically transparent substrate. The recording layer 19 typically includes multiple layers, for example a protective layer and a reflective layer, etc., but the structure is not limited to those layers so long as the recording layer 19 has similar information recording characteristics when illuminated with a light beam. By way of example, either phase-changeable multiple films or magneto-optical multiple films may be used to form the recording layer 19.

Figure 1:
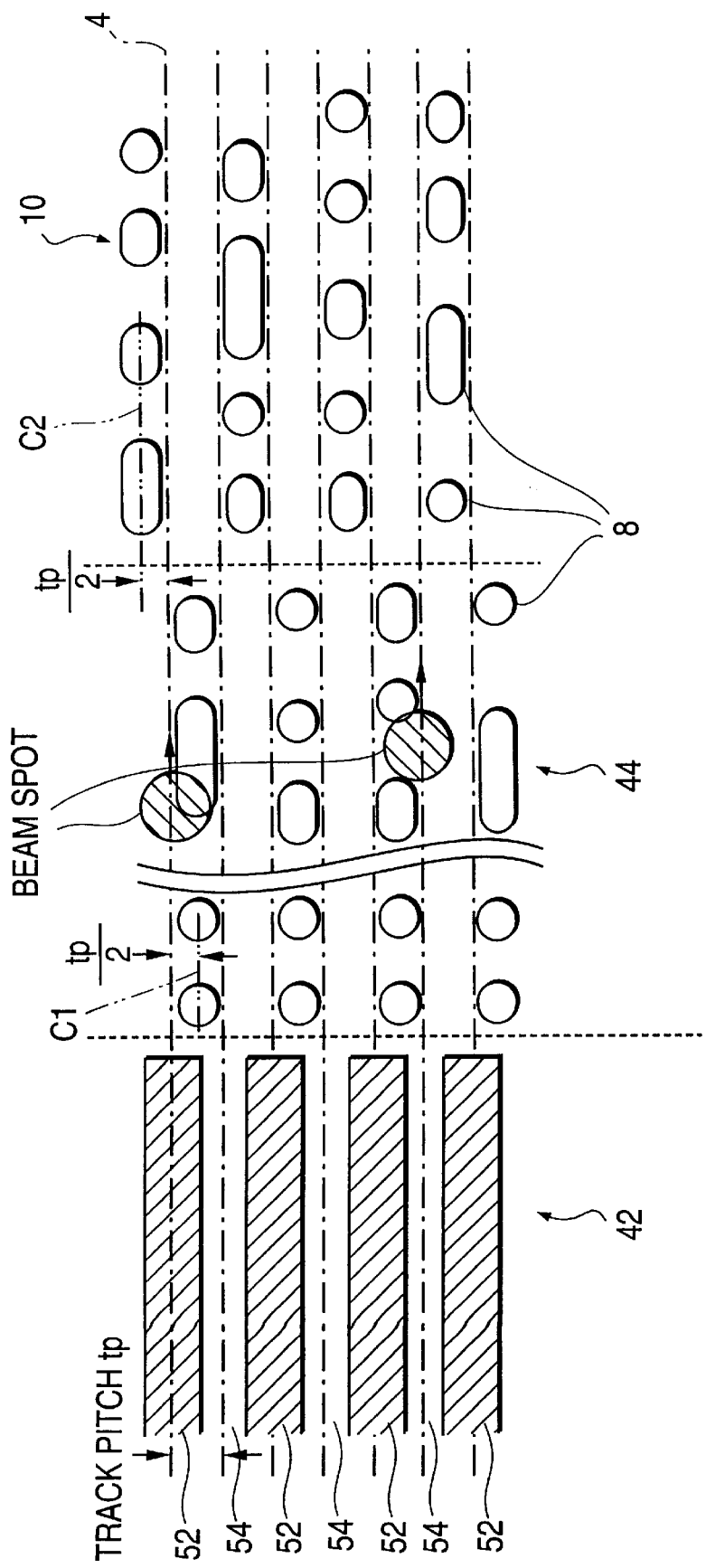
FIG. 1 is an elevational diagrammatic view of a typical current DVD-RAM illustrating the format and the information reproduction manner of the prepit header portion and the land/groove information storage portion of a typical current DVD-RAM.

As shown in FIG. 1, for example, the optical disk 10 includes recording fields 42 consisting of lands 54 and grooves 52 for use in recording various kinds of user information such as image data and sound data, etc., and a header region 44 in which address information has been recorded. Each header region stores therein certain information by using pit arrays formed as prepits 8, and these prepit arrays have a different optical phase with respect to adjacent portions of the disk 10 where the prepit arrays are not formed.

During the recording and reproducing of information, a spindle motor 11 rotates the optical disk 10 at an appropriate speed under the control of driving signals received from a motor driver 12. At the same time, a semiconductor laser such as a laser diode (LD) 14 is electrically driven by an LD driver 13 to emit a light beam. The light beam emitted from the semiconductor laser 14 is converted into a plane wave beam by a collimator lens 15, and thereafter, the plane wave light beam is guided to an objective lens 18, passing through a polarization beam splitter (PBS) 16 and then through a quarter-wave plate 17. The light beam is then focused onto the optical disk 10 by the objective lens 18. The focusing position of the objective lens 18 is controlled by a focusing servo system (not shown) in such a way as to let the light beam form a small and fine beam spot 6 on the recording layer 19 of the optical disk 10.

Here, the semiconductor laser 14 and the objective lens 18 constitute the focusing unit of the present invention. The collimator lens 15, the polarization beam splitter (PBS) 16, and the quarter-wave plate 17 may also be included in the focusing unit.

Further, the scanning movement of the beam spot 6 is controlled by a tracking servo system (not shown) in such manner that in the recording fields 42 of the optical disk 10 the beam spot 6 scans along a locus exactly overlying the center line of the lands 54 and the grooves 52, as shown in FIG. 1, while in the header regions 44 of the optical disk 10 the beam spot scans along a locus spaced by the distance Δ in a radial direction away from the center lines C1 and D1 of the prepit arrays 8.

The light beam focused onto the recording layer 19 of the optical disk 10 is reflected by a reflecting layer in the recording layer 19, and the reflected light beam is returned to the objective lens 18 where it is converted into a plane wave beam again. The plane wave light beam passes through the quarter-wave plate 17 and is thereby polarized vertically relative to the incoming light beam; and accordingly, the light beam is reflected by the polarization beam splitter 16. The resultant light beam reflected by the polarization beam splitter 16 is converged by a condensing lens 20 onto a photo detector 21 which constitutes a detecting unit.

The photo detector 21 has at least two detecting areas 23a and 23b which are divided by at least one divisional line extending parallel to a line tangent to the information track. The reflected light beam directed onto the photo detector 21 is subject to photoelectric conversion and thus causes the detecting areas 23a and 23b to generate and output independent electrical current signals that are substantially proportional to the optical power of the incident light beam that reaches the respective detecting areas 23a and 23b.

The current signals output from the photo detector 21 which correspond to the detecting areas 23a and 23b are converted by current-to-voltage converting amplifiers 24a and 24b into voltage signals which are then fed into the inverted and non-inverted inputs of a differential amplifier 25. Accordingly, the output of the differential amplifier 25 presents a push-pull signal that corresponds to the difference SR'−SL', which is proportional to the difference between the optical power of the incident light beams received by the detecting areas 23a and 23b of the photo detector 21.

The difference signal which is output from the differential amplifier 25 is then input to a signal processing circuit 26. The signal processing circuit 26 effectuates appropriate processing including equalization and analog-to-digital conversion with respect to the reproduction signal being input thereto via the differential amplifier 25, thereby outputting the reproduced data corresponding to the prepits on the optical disk 10.

Although FIG. 7 shows only a system for reproducing by using the prepits in the header region of the optical disk 10 at the stage following the photo detector 21, in the actual optical disk apparatus, the user information such as images, audio, various kinds of data and the like can been recorded in the recording field that includes the lands and the grooves in the case of the illustrative disk format of the current DVD-RAM illustrated in FIG. 1, by way of example. Thus, the optical disk apparatus as is also designed to reproduce such user information.

In the recording field 42, a beam spot converged onto the optical disk 10 scans the locus overlying the track center line of the lands and the grooves. Thus, it becomes possible to reproduce the user information recorded in the recording fields by employing the sum of the output signals of the photo detector 21 which signals correspond to the two light-receiving areas 23a, 23b as a playback signal, while allowing the signal processing circuit 26 to likewise perform the required processing steps such as equalization, analog-to-digital conversion, and the like with respect to this playback signal.

Further, in the actual optical disk apparatus, a focusing error signal and a tracking error signal are required to perform the prescribed focusing and tracking servo operations. In this respect, the focusing error signal and the tracking error signal are obtainable by adequately modifying the configuration of the photo detector 21 in a way that is described later to thereby effectuate certain operational processing with respect to the output signals corresponding to a plurality of light-receiving segments.

Next, a detailed description of the photo detector 21 will be presented with reference to FIGS. 8 and 9.

FIG. 8A shows the photo detector 21 as viewed form its optical beam incident surface. The relation between the detector 21 and the recording layer 19 of the optical disk 10 is as shown in FIG. 3.

In the conventional optical disk apparatus, for example, an optical disk apparatus for the current DVD-RAM, the two-segment split photo detector for use in reproduction of header field is constituted such that the divisional line that divides the light receiving surface is parallel to a line tangent to the track and passes through the center line of the zero-order diffracted beam. The difference (or push-pull) signal derived from the output signals presented by the two light receiving surfaces of the two segment split photo detector is used as the playback signal for the header field.

On the contrary, in the present invention, a two-segment split photo detector is used as the photo detector 21, as is shown in FIG. 8A, in which the divisional line 22 (parallel to a line tangent to the track and dividing the light receiving surface into two segments) is shifted away from the center line of the zero-order diffracted beam (indicated by the alternately long-and-short-dash line) by a distance d in the direction of the disk radius, and the light receiving surface is divided into two light receiving segments 23a and 23b by the divisional line 22.

Here, the distance d, the amount of the deviation, can be properly determined depending upon the wavelength of the laser diode 14 used as a light source, the numerical aperture of the objective lens 18, the shape of the pits (the pit depth, the inclination angle of a pit wall surface, etc.) on the optical disk 10, the beam spot size on the optical disk 10, the distance between the center of the beam spot and the center line of the prepit array, and the like. This distance d is desired to be about 12% to 40% of the diameter of the zero-order diffracted beam detected on the photo detector 21, as will be described later.

The difference between the output signals corresponding to the light receiving areas 23a and 23b of the photo detector 21, generated by the differential amplifier 25 which is fed by the current-voltage conversion amplifiers 24a and 24b, is used as the playback signal for the header field.

FIG. 9 indicates the dependency of the signal amplitude of the difference and the sum signals as functions of the distance d, produced upon reproduction from the prepit arrays of the type shown in FIGS. 4 and 6 as described above. This distance d is normalized such that "1" represents the diameter of the zero-order diffracted beam on the light receiving surface of the photo detector 21. The origin on the axis of FIG. 9 (d=0) corresponds to the divisional line that passes through the center of the zero-order diffracted beam, which is used for reproduction of the header field in current DVD-RAMs.

As is obvious from FIG. 9, the amplitude of the sum signal is theoretically constant and is independent of the distance d; however, the amplitude of the difference signal becomes larger than that of the sum signal when the distance d is in the vicinity of 0.08 and reaches a maximum value when the distance d is approximately 0.25. Apparently, the amplitude of the difference signal varies smoothly around its maximum value, and the difference signal can achieve an amplitude larger than the sum signal over a wide range of the distances d. Especially in the range of the distance d equal to 0.12 to 0.4, the amplitude of the difference signal is more than 10% larger than that of the sum signal. That is, the distance d preferably kept in the range of 12% to 40% of the diameter of the zero-order diffracted beam of the reflected beam on the light receiving surface of the photo detector 21.

Further, it is known that the preferable range of the distance d is almost independent of the pit width. However, the direction for shifting the divisional line 22 is reversed with respect to the center line of the zero-order diffracted beam in the case where the optical phase difference caused by the pits is 0° to 180° and in the case where it is 180° to 360°.

FIG. 8B shows another example of a photo detector for use in the optical disk apparatus of the present invention. The photo detector 31 of FIG. 8B is a four-segment split photo detector in which the light receiving surface is divided into four light receiving areas 33a, 33b, 33c and 33d by three divisional lines 32a, 32b and 32c parallel to each other and to a line tangent to the track. Here, the center divisional line 32b is located on the center line of the zero-order diffracted beam of the reflection beam irradiated onto the light receiving surface of the photo detector 31. Therefore, the divisional lines 32a and 32c located on both sides of the divisional line 32b are shifted apart each by the distance d in opposite directions and in the direction of the disk radius away from the center line of the zero-order diffracted beam.

In the photo detector 21 shown in FIG. 8A, because there is only the single divisional line 22 parallel a line tangent to the track, the photo detector 21 is effective in the case when the beam spot is shifted to one specified side, which must be known in advance, of the prepit center line. On the contrary, the photo detector 31 of FIG. 8B is effective in the case when the beam spot is deviated to either side of the prepit center line by selecting combinations of the light receiving segments from "33a" and "33b+33c+33d", on the one hand, or from "33d" and "33a+33b+33c", on the other hand, for obtaining the difference signal in accordance with which side of the prepit center line the beam spot is positioned upon.

Further, by using a combination of the signals generated by the light receiving areas "33a+33b" and "33c+33d", thereby assuming the divisional line 32b to be the segment boundary, for computing the differences signal in FIG. 8B in addition to the above signal computations, the tracking error signal based on the push-pull method can also be obtained. Therefore, the photo detector 31 can be used to a tracking error detection at the same time, thereby providing advantages for reduction in the size and the cost of the optical disk apparatus.

FIG. 8C shows yet another example of a photo detector for use in the optical disk apparatus of the present invention. In this photo detector 41, the divisional line 32b in the center of the photo detector 31 shown in FIG. 8B is removed, and three light receiving areas or segments 43a, 43b and 43c created by the two divisional lines 42a and 42b each shifted away from the center line of the zero-order diffracted beam of the reflected beam irradiated onto the light receiving surface by the distance d, but in opposite directions. Such a three-segment split photo detector 41 can obtain the same effect as the four-segment split photo detector 31 when used to reproduce the header field by selecting combination of the segments from "43a" and "43b+43c" or from "43c" and "43a+43b" for obtaining the difference signal.

FIG. 8D is still another example of a photo detector for use in the optical disk apparatus of the present invention. In this photo detector 51, a divisional line 52d, parallel to the direction of the disk radius, which is perpendicular to the direction of a track tangential line, is added to the photo detector 31 shown in FIG. 8B. In this example, the photo detector 51 is an eight-segment split photo detector, in which its light receiving surface is divided into eight light receiving segments by three divisional lines 52a, 52b and 52c parallel to the direction of a track tangential and a divisional line 52d parallel to the direction of a disk radius and passing through the center line of the zero-order diffracted beam. Likewise to FIG. 8B, the divisional line 52b parallel to the direction of a track tangent line is located on the center line of the zero-order diffracted beam of the reflected beam irradiating onto the light receiving surface of the photo detector 51, and the divisional lines 52a and 52c parallel to the direction of a track tangential line are located on opposite sides of the divisional line 52b shifted away from the line 52b in the direction of a disk radius by the distance d.

With the photo detector 51 of FIG. 8D, the same effect can be obtained with the photo detector 31 of FIG. 8B to reproduce the header field and detect the tracking error. Further, by addition and subtraction of the output signals corresponding to the four light receiving surfaces divided by the divisional lines 52b and 52d, a focus error signal based on an astigmatism method for the optical system can be obtained. In this case, a cylindrical lens can be applied at the back of the condensing lens 20 adequately. Consequently, the photo detector 51 can be used both as a photo detector for the reproduction of the header field and also as a photo detector for detecting the tracking error as well as the focusing error at the same time, thereby providing further reduction of the size and the cost of the optical disk apparatus.

In the above embodiments, an optical disk on which embossed pits are formed as prepit arrays. However, the mark arrays having an optical phase difference relative to the non-mark regions, for example, can be formed as prepit arrays.

As described above, according to the present invention, an optical disk apparatus capable of obtaining a better playback signal having greater signal amplitude and suitable for use with a plurality of differing types of optical disks that are different in track pitch and in recording density, for example, when reproducing information by using a light beam to scan along certain lines spaced a predefined distance from the center line of a mark array having an optical phase difference relative to the non-mark regions, such as pit arrays, can be achieved.

The foregoing discussion discloses and describes merely an exemplary embodiment of the present invention. As will be understood by those skilled in the art, the present invention may be embodied in other specific forms without departing from the spirit or essential characteristics thereof. Accordingly, the disclosure of the present invention is intended to be illustrative, but not limiting, of the scope of the invention, which is set forth in the following claims. The entire contents of Japanese Patent Application H10-071974, filed Mar. 20, 1998, is incorporated herein by reference.

What is claimed is:

1. An optical disk apparatus for reproducing information from an optical recording medium, comprising:

a light emitting unit that focuses a light beam onto the optical recording medium;

a detecting unit that detects the light beam reflected by the optical recording medium;

a processing unit that processes a signal generated by the detecting unit and outputs a processed signal that reproduces the recorded information;

wherein the optical recording medium has reproducible information formed as mark arrays which have an optical phase difference with respect to adjacent portions of the mark arrays;

the light emitting unit focuses the light beam so as to trace along a line shifted away from the center lines of the mark arrays by a predetermined distance in a radial direction with respect to the center of the optical recording medium;

the detecting unit includes a detector having a detecting surface which is divided into two segments along a first line which is shifted a certain distance from the center of a zero-order diffracted beam spot being guided over the detecting surface; and the processing unit computes the difference between the signal values detected in the segments, and outputs this difference as the processed signal.

2. The optical disk apparatus according to claim 1, wherein the first line is parallel to the direction corresponding to a track tangential direction of the optical recording medium.

3. The optical disk apparatus according to claim 2, wherein the certain distance is a percentage of the diameter of the zero-order diffracted beam on the detecting surface in the range of between about 12 and 40 percent of the diameter.

4. An optical disk apparatus for reproducing information from an optical recording medium, comprising:

a light emitting unit that focuses a light beam onto the optical recording medium;

a detecting unit that detects the light beam reflected by the optical recording medium;

a processing unit that processes a signal generated by the detecting unit and outputs a processed signal that reproduces the recorded information;

wherein the optical recording medium has reproducible information formed as mark arrays which have an optical phase difference with respect to adjacent portions of the mark arrays;

the light emitting unit focuses the light beam so as to trace along a line shifted away from the center lines of the mark arrays by a predetermined distance in a radial direction with respect to the center of the optical recording medium;

the detecting unit includes a detector having a detecting surface which is divided into three segments separated by a first line and a second line parallel to the first line, wherein the first and the second lines are each shifted a certain distance and in opposite directions from the center of the zero-order diffracted beam spot on the detecting surface; and the processing unit computes the difference between the signal values detected in the segments, and outputs this difference as the processed signal.

5. The optical disk apparatus according to claim 4, wherein the processing unit computes both the difference between the signal value detected in the segment at one edge and the sum of the signal values detected in the segments in the middle and at the other edge, and the difference between the signal value detected in the segment at the other edge and the sum of the signal values detected in the segments at one edge and in the middle, and outputs one of the differences as a processed signal to reproduce information on the second area.

6. An optical disk apparatus for reproducing information from an optical recording medium, comprising:

a light emitting unit that focuses a light beam onto the optical recording medium;

a detecting unit that detects the light beam reflected by the optical recording medium;

a processing unit that processes a signal generated by the detecting unit and outputs a processed signal that reproduces the recorded information;

wherein the optical recording medium has reproducible information formed as mark arrays which have an optical phase difference with respect to adjacent portions of the mark arrays;

the light emitting unit focuses the light beam so as to trace along a line shifted away from the center lines of the mark arrays by a predetermined distance in a radial direction with respect to the center of the optical recording medium;

the detecting unit includes a detector having a detecting surface which is divided into eight segments separated by first, second and third lines parallel to each other and a fourth line perpendicular to the first, second and third lines, wherein the third line passes through the center of the zero-order diffracted beam spot on the detecting surface; and the processing unit computes the difference between the signal values detected in the segments, and outputs this difference as the processed signal.

7. The optical disk apparatus according to claim 6, wherein the processing unit computes both the difference between the signal values detected in a pair of segments adjacent to the fourth line and positioned at one edge and the sum of the signal values detected in the remaining segments and the difference between the signal values detected in a pair of segments adjacent to the fourth line and positioned at the other edge and the sum of the signal values detected in the remaining segments, and outputs one of the differences as the processed signal to reproduce information on the second area.

8. The optical disk apparatus according to claim 7, wherein the processing unit computes the difference between the signal values detected in the segments on either side of the third line, and outputs the difference as a tracking error signal on the first area.

9. The optical disk apparatus according to claim 7, wherein the processing unit computes the difference between the signal values detected in a diagonal pair of the four segments separated by the third line and fourth line and the signal values detected in the other diagonal pair thereof, and outputs the difference as a focusing error signal on the first and second areas.

10. The optical disk apparatus according to claim 4, wherein the first and second lines are parallel to the direction corresponding to a track tangential direction of the optical recording medium.

11. The optical disk apparatus according to claim 10, wherein the certain distance is a percentage of the diameter of the zero-order diffracted beam on the detecting surface in the range of between about 12 and 40 percent of the diameter.

12. The optical disk apparatus according to claim 6, wherein the first, second and third lines are parallel to the direction corresponding to a track tangential direction of the optical recording medium.

13. The optical disk apparatus according to claim 12, wherein the first and second lines are each shifted a certain distance and in opposite directions from the center of the zero-order diffracted beam spot on the detecting surface, and wherein the certain distance is a percentage of the diameter of the zero-order diffracted beam on the detecting surface in the range of between about 12 and 40 percent of the diameter.

* * * * *